United States Patent
Querard et al.

(10) Patent No.: US 10,718,712 B2
(45) Date of Patent: Jul. 21, 2020

(54) METHOD FOR DETECTING FLUORESCENT SPECIES THAT ARE REVERSIBLY PHOTOSWITCHABLE AT A HIGH FREQUENCY

(71) Applicants: CENTRE NATIONAL DE LA RECHERCHE SCIENTIFIQUE, Paris (FR); SORBONNE UNIVERSITE, Paris (FR); ECOLE NORMALE SUPERIEURE, Paris (FR)

(72) Inventors: Jérôme Querard, Montrouge (FR); Thomas Le Saux, Paris (FR); Ludovic Jullien, Arcueil (FR)

(73) Assignees: CENTRE NATIONAL DE LA RECHERCHE SCIENTIFIQUE, Paris (FR); SORBONNE UNIVERSITE, Paris (FR); ECOLE NORMALE SUPERIEURE, Paris (FR)

(*) Notice: Subject to any disclaimer, the term of this patent is extended or adjusted under 35 U.S.C. 154(b) by 0 days.

(21) Appl. No.: 16/330,040

(22) PCT Filed: Aug. 10, 2017

(86) PCT No.: PCT/EP2017/070307
§ 371 (c)(1),
(2) Date: Mar. 1, 2019

(87) PCT Pub. No.: WO2018/041588
PCT Pub. Date: Mar. 8, 2018

(65) Prior Publication Data
US 2019/0212268 A1    Jul. 11, 2019

(30) Foreign Application Priority Data

Sep. 2, 2016   (FR) ..................... 16 58163

(51) Int. Cl.
*G01N 21/64* (2006.01)
*G02B 21/16* (2006.01)

(52) U.S. Cl.
CPC ..... *G01N 21/6428* (2013.01); *G01N 21/6458* (2013.01); *G02B 21/16* (2013.01);
(Continued)

(58) Field of Classification Search
CPC .......... G01N 21/6428; G01N 21/6458; G01N 2021/6441; G01N 2021/6419; G02B 21/16
See application file for complete search history.

(56) References Cited

U.S. PATENT DOCUMENTS

| 7,964,333 B1* | 6/2011 | Belfield | ................ | B82Y 10/00 430/270.13 |
| 2016/0084763 A1* | 3/2016 | de Boer | ............. | G01N 21/6458 250/459.1 |

(Continued)

FOREIGN PATENT DOCUMENTS

WO    2015/075209 A1    5/2015

OTHER PUBLICATIONS

Brakemann et al., "A reversibly photoswitchable GFP-like proton with fluorescence excitation decoupled from switching," Sep. 2011, Nature Biotechnology, DOI:10.1038/nbt.1952, pp. 942-947. (Year: 2011).*

(Continued)

*Primary Examiner* — Kiho Kim
(74) *Attorney, Agent, or Firm* — Baker & Hostetler LLP

(57) ABSTRACT

A method is provided for detecting a fluorescent species that is reversibly photoswitchable at high frequency, and more precisely to a method for detecting at least one reversibly photoswitchable fluorescent species, including a step consisting in illuminating a sample containing a reversibly (Continued)

photoswitchable fluorescent species with a first illuminating light beam, of wavelength $\lambda_1$, and periodically modulated at an angular frequency $\omega$, and with a second illuminating light beam of wavelength $\lambda_2$ different from $\lambda_1$, which is periodically modulated at the angular frequency $\omega$, the second illuminating light beam being modulated in antiphase with respect to the first illuminating light beam.

15 Claims, 6 Drawing Sheets

(52) U.S. Cl.
CPC ............... *G01N 2021/6419* (2013.01); *G01N 2021/6441* (2013.01)

(56) References Cited

U.S. PATENT DOCUMENTS

2016/0305883 A1* 10/2016 Betzig .................... G02B 21/16
2017/0370847 A1* 12/2017 Ghadiali ............ G01N 21/6428

OTHER PUBLICATIONS

Querard, et al., "Kinetics of Reactive Modules Adds Discriminative Dimensions for Selective Cell Imaging", Chemphyschem, vol. 17, No. 10, pp. 1396-1413, May 18, 2016.

Querard, et al., "Photoswitching kinetics and phase-sensitive detection add discriminative dimensions for selective fluorescence imaging", Angew Chem Int Editioin, vol. 54, No. 9, pp. 2633-2637, Jan. 21, 2015.

Querard, et al., "Out-of-phase imaging after optical monochromatic modulation", Program, 248th ACS National Meeting and Exposition, Aug. 13, 2014.

Marriott, et al., "Optical lock-in detection imaging microscopy for contrast-enhanced imaging in living cells", Proc Natl Acad Sci U S A., vol. 105, No. 46, pp. 17789-17794, Nov. 18, 2008.

Yan, et al., "Reversible optical control of cyanine fluorescence in fixed and living cells: optical lock-in detection immunofluorescence imaging microscopy", Philosophical Transactions, Royal Society of London, B: Biol Sci., vol. 368, No. 1611, p. 20120031, Dec. 24, 2012.

Yan, et al., "Optical switch probes and optical lock-in detection (OLID) imaging microscopy: high-contrast fluorescence imaging within living systems", Biochemical Journal, vol. 433, No. 3, pp. 411-422, Feb. 1, 2011.

Querard, et al., "Out-of-phase titration after modulation of activating light (OPTIMAL) for selective and quntitative detection", Program, 248th ACS National Meeting and Exposition, Aug. 12, 2014.

Chen et al., "Optically Modulated Photoswitchable Fluorescent Proteins Yield Improved Biological Imaging Sensitivity", Journal of the American Chemical Society, 137(40), pp. 12764-12767, 2015.

Petchprayoon, et al., "Rational design, synthesis, and characterization of highly fluorescent optical switches for high-contrast optical lock-in detection (OLID) imaging microscopy in living cells", Bioorganic & Medicinal Chemistry, vol. 19, No. 3, pp. 1030-1040, Jul. 7, 2010.

* cited by examiner

METHOD FOR DETECTING FLUORESCENT SPECIES THAT ARE REVERSIBLY PHOTOSWITCHABLE AT A HIGH FREQUENCY

CROSS-REFERENCE TO RELATED APPLICATIONS

This application is a National Stage of International patent application PCT/EP2017/070307, filed on Aug. 10, 2017, which claims priority to foreign French patent application No. FR 1658163, filed on Sep. 2, 2016, the disclosures of which are incorporated by reference in their entirety.

FIELD OF THE INVENTION

The invention relates to a method for detecting fluorescent species that are reversibly photoswitchable at high frequency. Such a method has many applications, in particular in chemistry, in biology and in the field of environmental measurements and screening.

BACKGROUND

The term "species" is understood to mean a chemical species such as a molecule or a complex, or a physical object such as a nanoparticle. The expression "reversibly photoswitchable species" is understood to mean a species that has at least two distinct states having different fluorescence properties and that may be made to pass from one state to the other reversibly under the effect of light. Examples of reversibly photoswitchable fluorescent species are the protein "Dronpa" and the complex "Spinach-DFHBI" ("Spinach" being an RNA aptamer and DFHPI a fluorogenic probe). These species may in particular be used as probes or markers. Other examples of reversibly switchable fluorescent species may be azo derivatives or indeed protein scaffolds.

Fluorescence imaging, and more particularly fluorescence microscopy, has become an indispensable tool in biology, but also in other disciplines such as the science of materials. Its applications are however limited by the ability to observe a signal of interest on a background of fluorescence or noise. This problem is particularly acute in animal or plant in vivo imaging applications, in which the fluorescent markers to be detected are dispersed in a complex autofluorescent and/or scattering medium; the useful signal is then hidden in intense background noise.

Another limit on fluorescence imaging and detecting technique resides in the width of the spectral band of the fluorophores generally employed, with respect to the width of the visible spectral band: it is difficult to selectively detect more than four fluorescent markers in the same sample, because their emission spectra tend to superpose.

To overcome these limits, the patent application WO 2015075209 A1 and the article by J. Querard et al. "Photoswitching Kinetics and Phase-Sensitive Detection Add Discriminative Dimensions for Selective Fluorescence Imaging", Angew. Chem. Int. Ed. 2015, 54, 266-2637 (2015), disclose a method using reversibly photoswitchable fluorescent probes, in which method a sample, containing a photoswitchable fluorophore species, is illuminated with a periodically modulated light wave. The component of the intensity emitted by the fluorophores at the same angular frequency is then detected, in phase quadrature with respect to the excitation wave. This method allows certain reversibly photoswitchable fluorophores to be selectively detected while minimizing, under certain conditions that are calculated analytically depending on the characteristics of the fluorophore, the noise generated, in conventional methods, by autofluorescence and/or diffusion in the medium of the sample. One of the problems of this method resides in the frequency of acquisition of successive images. The various reversibly photoswitchable fluorescent species used in the prior art are induced to pass from an activated state to their initial non-activated state thermally: the characteristic time of this transition is for example from 5 to 10 seconds and corresponds to the acquisition time of an image using this method. This timescale is too long to take a substantial, biologically relevant number of measurements.

Another prior-art technique is disclosed in the article by Yen-Cheng Chen et al. (Chen, Y. C., Jablonski, A. E., Issaeva, I., Bourassa, D., Hsiang, J. C., Fahmi, C. J., & Dickson, R. M., 2015, *Optically Modulated Photoswitchable Fluorescent Proteins Yield Improved Biological Imaging Sensitivity*, Journal of the American Chemical Society, 137(40), 12764-12767) which proposes a fluorophore-detecting method that uses two monochromatic sources of laser light of different excitation wavelengths to achieve heterodyne excitation of a reversibly photoswitchable fluorescent species. This technique proposes an empirical choice of the parameters of measurement of the fluorescence of a species, this preventing this type of measurement from being easily transposed to other species. In addition, the signal-to-noise ratio during the measurement of a reversibly photoswitchable fluorescent species is not optimal. Lastly, the disclosed method does not indicate to a person skilled in the art how to observe two reversibly photoswitchable fluorescent species at the same time.

Yet another prior-art technique that makes it possible to exploit the temporal dynamic range of a reversibly photoconvertible probe—which is specific thereto and different from that of interfering fluorophores—to extract a useful signal from the background noise is known as optical lock-in detection (OLID). This technique is described in the article by G. Marriott et al. "Optical lock-in detection imaging microscopy for contrast-enhanced imaging in living cells", PNAS, vol. 105, no 46, pages 17789-17794 (18 Nov. 2008), and in the article by Y. Yan et al. "Optical switch probes and optical lock-in detection (OLID) imaging microscopy: high-contrast fluorescence imaging with living systems", Biochem J (2011), 411-422 and in the article by C. Petchprayoon et al. "Rational design, synthesis, and characterization of highly fluorescent optical switches for high-contrast optical lock-in detection (OLID) imaging microscopy in living cells", Bioorganic & Medicinal Chemistry 19 (2011), 1030-1040. One drawback of this technique is that it delivers no quantitative information on the concentration of the reversibly photo convertible fluorophores.

SUMMARY OF THE INVENTION

The invention aims to remedy the aforementioned drawbacks of the prior art, and more particularly to:

image a sample while differentiating a plurality of different fluorophores;

allow fluorophores to be imaged at high frequency using a technique allowing autofluorescence/scattering noise to be removed;

generally, one or more fluorescent probes in a mixture to be selectively and quantitatively imaged.

One subject of the invention allowing this aim to be partially or entirely achieved is a method for detecting at least one reversibly switchable fluorescent species, including the following steps:

(a) illuminating a sample containing said at least one said reversibly photoswitchable fluorescence species with a first illuminating light beam, of wavelength $\lambda_1$, and periodically modulated at an angular frequency $\omega$, and with a second illuminating light beam, of $\lambda_2$ different from $\lambda_1$, periodically modulated at said angular frequency $\omega$;

(b) detecting fluorescence radiation emitted by said sample thus illuminated; and (c) extracting the amplitude from the component of the intensity of said fluorescence radiation that has the same periodicity as said periodically modulated first illuminating light beam and that is in phase quadrature therewith;

said second illuminating light beam being modulated in antiphase with respect to said first illuminating light beam; and the average intensity of said first illuminating light beam, the average intensity of said second illuminating light beam, and their angular frequency $\omega$ being chosen so as to get close to a maximum of said amplitude of the intensity component of said fluorescence radiation. For example, the amplitude may have a value equal to at least 75%, preferably 80%, even more preferably 90% of the maximum.

According to one particular embodiment of such a method, at least one said reversibly photoswitchable fluorescent species may have a first and second chemical state, at least one of said states being fluorescent, said or each said reversibly photoswitchable fluorescent species being capable of being converted from said first state to said second state via a first photo-induced reaction, then of returning to said first state via a second photo-induced reaction, and said first illuminating light beam may have an average intensity $I_1^0$ and be modulated at an angular frequency $\omega$ and said second illuminating light beam may have an average intensity $I_2^0$ with:

$$(\sigma_{12,1}+\sigma_{21,1})I_1^0=(\sigma_{12,2}+\sigma_{21,2})I_2^0$$

and $$\omega=2(\sigma_{12,1}+\sigma_{21,1})I_1^0$$

where $\sigma_{12,1}I_1^0$ and $\sigma_{21,1}I_1^0$ are the rate constants of said first and said second reactions photo-induced by said first illuminating light beam, respectively; and where $\sigma_{12,2}I_2^0$ and $\sigma_{21,2}I_2^0$ are the rate constants of said first and said second reactions photo-induced by said second illuminating light beam, respectively.

Moreover, the average intensity of said first illuminating light beam, the average intensity of said second illuminating light beam, and their angular frequency $\omega$ may also be chosen so as to ensure a minimum contrast between said amplitude of the intensity component of said fluorescence radiation and the amplitude of a fluorescence intensity component having the same periodicity generated by interfering species.

Another subject of the invention is a method for detecting at least two reversibly photoswitchable fluorescent species having different dynamic properties, including the following steps:

(a) illuminating a sample containing each said reversibly photoswitchable fluorescent species with a first illuminating light beam of wavelength $\lambda_1$ and periodically modulated with a first function summing at least two first illuminating components that are modulated with angular frequencies $\omega i$, each said angular frequency $\omega i$ of each said first illuminating component being associated with one said reversibly photoswitchable fluorescent species, and being different from the one or more other said angular frequencies $\omega i$; and illuminating the sample with a second illuminating light beam, of wavelength $\lambda_2$ different from $\lambda_1$, and periodically modulated with a second function summing at least two second illuminating components that are modulated with said angular frequencies $\omega i$, each said angular frequency $\omega i$ of each said second illuminating component being equal to a said angular frequency $\omega i$ of a said first illuminating component;

(b) detecting fluorescence radiation (FLU) emitted by said sample thus illuminated;

(c) extracting each (algebraic) amplitude of the component of the intensity of said fluorescence radiation that has the same angular frequency $\omega i$ as each said illuminating component, and that is in phase quadrature with each said first illuminating component;

for each said angular frequency $\omega_i$, each said second illuminating component modulated with said angular frequency $\omega_i$ being in antiphase with respect to each said first illuminating component modulated with said angular frequency $\omega_i$;

and the average intensity of said first illuminating light beam, the average intensity of said second illuminating light beam, and said angular frequencies being chosen so as to get close to a maximum of each said amplitude of the intensity component of said fluorescence radiation.

According to particular embodiments of such a method:

Each said reversibly photoswitchable fluorescent species may have a first and a second chemical state, at least one of said states being fluorescent, each said reversibly photoswitchable fluorescent species being capable of being converted from said first state to said second state via a first photo-induced reaction, then of returning to said first state via a second photo-induced reaction, and said first illuminating light beam may have an average intensity $I_1^0$ and be periodically modulated with a said first function, and said second illuminating light beam may have an average intensity $I_2^0$ with, for each said reversibly photoswitchable fluorescent species:

$$(\sigma_{12,1}+\sigma_{21,1})I_1^0=(\sigma_{12,2}+\sigma_{21,2})I_2^0$$

where $\sigma_{12,1}I_1^0$ and $\sigma_{21,1}I_1^0$ are the rate constants of said first and said second reactions photo-induced by said first light beam illuminating said species, respectively; and where $\sigma_{12,2}I_2^0$ and $\sigma_{21,2}I_2^0$ are the rate constants of said first and said second reactions photo-induced by said second light beam illuminating said species, respectively.

For each said angular frequency $\omega_i$ corresponding to one said reversibly photoswitchable fluorescent species, it is possible for:

$$\omega_i=2(\sigma_{12,1}+\sigma_{21,1})I_1^0$$

where $\sigma_{12,1}I_1^0$ and $\sigma_{21,1}I_1^0$ are the rate constants of said first and said second reactions photo-induced by said first light beam illuminating said species, respectively. Advantageously, the ratio between at least two said angular frequencies $\omega_i$ is strictly higher than 10.

In said step e), said sample may be illuminated by at least one substantially monochromatic illuminating light beam.

Said steps b) and c) may be implemented via synchronous detection of said fluorescence radiation.

The method may also include the following step:

d) determining the concentration of said or at least one said reversibly photoswitchable fluorescent species from the component of the intensity of said fluorescence radiation which is extracted in said step c).

Said or at least one said reversibly photoswitchable fluorescent species is chosen from: a photochromic fluorescent protein; and a complex of a biomolecule with a fluorogenic probe.

The sample may contain biological material.

Yet another subject of the invention is a fluorescence-imaging (and in particular fluorescence-microscopy) method implementing such a detecting method. In this case, said sample may comprise a living organism, and at least one element chosen from the presence and concentration of a said reversibly photoswitchable fluorescent species may be measured on the basis of the component of the intensity of said fluorescence radiation which is extracted in said step c), without taking a sample of said living organism.

A said illuminating light beam comprises an amount of daylight and wherein said amount of daylight is included in the light intensity received by said reversibly photoswitchable fluorescent species but remains less than or equal to the average intensities of said illuminating light beams.

BRIEF DESCRIPTION OF THE DRAWINGS

The invention will be better understood and other advantages, details and features thereof will become apparent from the following explanatory description, which is given by way of example with reference to the appended drawings, in which.

DETAILED DESCRIPTION

Figure 1:
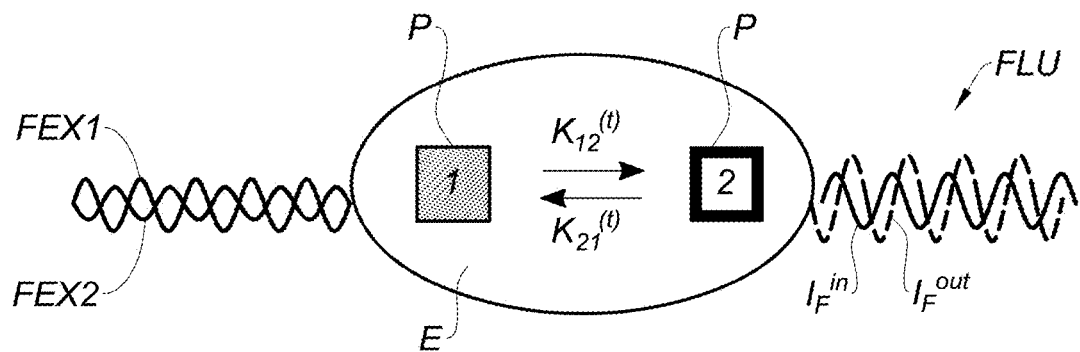
FIG. 1 illustrates a method for detecting a reversibly photoswitchable fluorescent species P according to the invention.

FIG. 1 illustrates a method for detecting a reversibly photoswitchable fluorescent species P according to the invention. The method comprises illuminating a sample E with a first illuminating light beam FEX1, of wavelength $\lambda_1$ and a second illuminating light beam FEX2, of wavelength $\lambda_2$ different from $\lambda_1$. Each of the illuminating light beams FEX1, FEX2 is preferably substantially monochromatic, i.e. its spectrum has a single intensity maximum and/or a spectral width narrower than or equal to 50 nm.

The reversibly photoswitchable fluorescent species P has two different states that are exchangeable under the action of light. It may be a question of a photochromic fluorescent species, or of any other system the dynamic behavior of which may be modelled as an exchange between two states under the action of light; these states may correspond to different stereochemical configurations of a molecule, to a bound/non-bound state of a complex, etc. In FIG. 1, the first state—which is thermodynamically more stable—is indicated by 1 and represented by a solid square; the second state—which is thermodynamic dynamically less stable—is indicated by 2 and represented by a hollow square. These two states possess different brightnesses. For the sake of simplicity, by way of nonlimiting example, only the state 1 is considered to be significantly fluorescent.

The sample E, and more precisely the species P that it contains, when illuminated by a first illuminating light beam FEX1 and by a second illuminating light beam FEX2, emits fluorescent radiation FLU the intensity of which is also modulated and which may be decomposed into:

a component in phase with the first illuminating light beam FEX1, which component is indicated in the figure by $I_F^{in}$; and a component in quadrature with the excitation beam, which component is indicated in the figure by $I_F^{out}$. Patent application WO 2015075209 A1 discloses the advantage and basis for observation of the component $I_F^{out}$ during the observation of the species P.

The dynamic behavior of a reversibly photoswitchable fluorescent species P may be described in the following way. Under the illumination of a species P with light of intensity I(t) containing two components $I_1(t)$ and $I_2(t)$, corresponding to a first illuminating light beam FEX1, of wavelength $\lambda_1$ and a second illuminating light beam FEX2, of wavelength $\lambda_2$, respectively, the dynamic behavior of the species P may be described by the following exchange between two states:

$$1 \underset{k_{21}(t)}{\overset{k_{12}(t)}{\rightleftharpoons}} 2 \qquad (1)$$

in which the state 1, which is thermodynamically more stable, is converted, via a photochemical reaction, into a thermodynamically less stable state 2 with a rate constant $k_{12}(t)=\sigma_{12,1}I_1(t)+\sigma_{12,2}I_2(t)$, and may return to the more stable initial state 1 via a photochemical and/or thermal process with a rate constant $k_{21}(t)=\sigma_{21,1}I_1(t)+\sigma_{21,2}I_2(t)+k_{21}^{\Delta}$, in which $\sigma_{12,1}I_1(t)$ $\sigma_{12,2}I_2(t)$, $\sigma_{21,1}I_1(t)$, $\sigma_{21,2}I_2(t)$ represent the photochemical contributions and $k_{21}^{\Delta}$ the thermal contribution to the rate constants, $\sigma_{12,1}$ being the cross section of photoconversion from the state 1 to the state 2 for the illumination of the light beam FEX1, $\sigma_{12,2}$ being the cross section of photoconversion from the state 1 to the state 2 for the illumination of the light beam FEX2, $\sigma_{21,1}$ being the cross section of photoconversion from the state 2 to the state 1 for the illumination of the light beam FEX1 and $\sigma_{21,2}$ being the cross section of photoconversion from the state 2 to the state 1 for the illumination of the light beam FEX1. All of these constants together define the behavior of the species P.

The system is assumed to be illuminated uniformly or may be considered to be uniform at any given time. The variation in the concentrations 1 (concentration in state 1 of species P) and 2 (concentration in state 2 of the species P) may then be described by the following system of equations:

$$\frac{d1}{dt} = -k_{12}(t)1 + k_{21}(t)2 \text{ and} \qquad (2)$$

$$\frac{d2}{dt} = k_{12}(t)1 - k_{21}(t)2 \qquad (3)$$

Considering the sample E to be suddenly illuminated by two constant illuminating sources, of wavelength $\lambda_1$ and $\lambda_2$, respectively, the illumination is characterized by the intensity $I(t)=I_1^0+I_2^0=I^0$ and the rate constants may be written in the form:

$$k_{12}(t)=k_{12}{}^0=k_{12,1}{}^0+k_{12,2}{}^0, \qquad (4)$$

$$k_{21}(t)=k_{21}{}^0=k_{21,1}{}^0+k_{21,2}{}^0+k_{21}{}^\Delta. \qquad (5)$$

where $$k_{12,1}{}^0=\sigma_{12,1}I_1{}^0, \qquad (6)$$

$$k_{21,1}{}^0=\sigma_{21,1}I_1{}^0, \qquad (7)$$

$$k_{12,2}{}^0=\sigma_{12,2}I_2{}^0, \qquad (8)$$

$$k_{21,2}{}^0=\sigma_{21,2}I_2{}^0. \qquad (9)$$

Considering the initial state to contain only the species 1, the concentrations 1 and 2 vary as follows:

$$2 - 2^0 = 1^0 - 1 = -2^0 \exp\left(-\frac{t}{\tau_{12}^0}\right) \text{ where} \qquad (10)$$

$$\tau_{12}^0 = \frac{1}{k_{12}^0 + k_{21}^0} \qquad (11)$$

corresponds to the relaxation time of a reversibly photoswitchable fluorophore and $1^0$ and $2^0$ to the concentrations 1 and 2 in the photostationary state achieved at the time $\tau_{12}{}^0$. Thus:

$$1^0 = P_{tot} - 2^0 = \frac{1}{1+K_{12}^0} P_{tot} \text{ where:} \qquad (12)$$

$$K_{12}^0 = \frac{k_{12}^0}{k_{21}^0} \qquad (13)$$

and the total concentration of the species P is $P_{tot}=1+2$.

It is possible to analyze the response in terms of fluorescent emission, or fluorescence radiation FLU of a reversibly photoswitchable fluorescent species P when it is subjected to two periodically modulated illuminating light beams FEX1, FEX2, corresponding to embodiments of the invention.

Generally, if a reversibly photoswitchable fluorescent species P is subjected to an illumination comprising two components: a periodic illumination $I_1(t)$ at the wavelength $\lambda_1$ and an illumination $I_2(t)$ at the wavelength $\lambda_2$, said illumination may be constant, this corresponding to an embodiment not according to the invention, or periodically modulated, this corresponding to embodiments of the invention. It is possible to write, in the most general case:

$$I(t)=I_1(t)+I_2(t) \qquad (35)$$

$$\text{and } I_j(t)=I_j^0[1+\alpha h_j(t)] \qquad (36)$$

with j=1 or 2. In equation (36), $\alpha$ corresponds to the amplitude of the light modulation and $h_j(t)$ corresponds to periodic functions. Equations (4) and (5) here become:

$$k_{12}(t)=k_{12,1}{}^0[1+\alpha h_1(t)]+k_{12,2}{}^0[1+\alpha h_2(t)] \qquad (37)$$

$$\text{and } k_{21}(t)=k_{21,1}{}^0[1+\alpha h_1(t)]+k_{21,2}{}^0[1+\alpha h_2(t)]+k_{21}{}^\Delta. \qquad (38)$$

By introducing a function $f(t)$, it is possible to write the expression for the concentrations in the following way:

$$2=2^0+\alpha f(t) \qquad (39)$$

$$\text{and } 1=1^0-\alpha f(t). \qquad (40)$$

The system of differential equations governing the variation as a function of time of the concentrations 1 and 2 may be solved with equations (2) and (3) to obtain:

$$\frac{df(x)}{dx} = -f(x) + [a_1 - b_1 f(x)]h_1(x) + [a_2 + b_2 f(x)]h_2(x) \qquad (41)$$

where:

$$x = \frac{t}{\tau_{12}^0} \qquad (42)$$

$$a_1 = \rho_{12}^0 \Delta_{12,1}^0 \tau_{12}^0 \qquad (43)$$

$$b_1 = \alpha(\sigma_{12,1} + \sigma_{21,1})I_1^0 \tau_{12}^0 \qquad (44)$$

$$a_2 = \rho_{12}^0 \Delta_{12,2}^0 \tau_{12}^0 \qquad (45)$$

$$b_2 = \alpha(\sigma_{12,2} + \sigma_{21,2})I_2^0 \tau_{12}^0 \text{ and where:} \qquad (46)$$

$$\rho_{12}^0 = k_{12}^0 1^0 = k_{21}^0 2^0 \qquad (47)$$

$$\Delta_{12,1}^0 = \frac{k_{12,1}^0}{k_{12,1}^0 + k_{12,2}^0} - \frac{k_{21,1}^0}{k_{21,1}^0 + k_{21,2}^0 + k_{21}^\Delta} \qquad (48)$$

$$\Delta_{12,2}^0 = \frac{k_{12,2}^0}{k_{12,1}^0 + k_{12,2}^0} - \frac{k_{21,2}^0}{k_{21,1}^0 + k_{21,2}^0 + k_{21}^\Delta} \qquad (49)$$

respectively designate the speed of the reaction corresponding to equation (1) in the stationary state (with $1^0$ and $2^0$ given by equation (12)) and the differences in the relative contributions of the averages of the modulated illuminations ($I_1^0$ and $I_2^0$, respectively) to the rate constants respectively leading to from state 1 to state 2 or from state 2 to state 1.

After the relaxation time $\tau_{12}^0$, a steady-state regime is entered into, in which $f(x)$ is a continuous periodic function. More generally, $f(x)$ may be a periodic function. In the various embodiments of the invention, an illuminating light beam FEX1, FEX2 may be modulated with a fundamental angular frequency $\omega$ or two fundamental angular frequencies ($\omega_1$ and $\omega_2$) or at least two fundamental angular frequencies, each of the various fundamental angular frequencies being denoted, in this case, by a generic term $\omega_i$.

In a first case, the Fourier series corresponding to $f(x)$ may be written in the form:

$$f(\theta x) = a^0 + \sum_{n=1}^{+\infty}[a^{n,cos}\cos(n\theta x) + b^{n,sin}\sin(n\theta x)] \text{ where:} \qquad (50)$$

$$\theta = \omega \tau_{12}^0, \qquad (51)$$

and where $a^{n,cos}$ and $b^{n,sin}$ designate the amplitudes of the nth components of the Fourier series.

In the second case, the Fourier series corresponding to $f(x)$ may be written in the form:

$$f(\theta_1 x, \theta_2 x) = \quad (52)$$
$$a^0 + \sum_{n=-\infty}^{+\infty}\sum_{m=-\infty}^{+\infty} \{a^{n,m,cos}\cos[(n\theta_1 + m\theta_2)x] + b^{n,m,sin}\sin[(n\theta_1 + m\theta_2)x]\}$$

where:

$$\theta_1 = \omega_1 \tau_{12}^0, \quad (53)$$

$$\theta_2 = \omega_2 \tau_{12}^0 \quad (54)$$

and where $a^0$, $a^{n,m,cos}$ and $b^{n,m,sin}$ correspond to the amplitudes of the 0-th and of the $\{n,m\}$-th components of the Fourier series. $a^0$ and/or $a^{n,m,cos}$ and/or $b^{n,m,sin}$ may be extracted from equation (41) by identifying components of the same order.

All of the obtained equations may be transformed so as to make the concentration modulations explicit for all the angular frequencies. It is then possible to write:

$$2 = 2^0 + \alpha \sum_{n=1}^{+\infty} [2^{n,sin}\sin(n\theta x) + 2^{n,cos}\cos(n\theta x)] \quad (55)$$

$$1 = 1^0 - \alpha \sum_{n=1}^{+\infty} [2^{n,sin}\sin(n\theta x) + 2^{n,cos}\cos(n\theta x)] \quad (56)$$

where $$2^0 = 2^0 + \alpha a^0, \quad (57)$$

$$1^0 = 1^0 - \alpha a^0, \quad (58)$$

$$2^{n,sin} = -1^{n,sin} = b^{n,sin}, \quad (59)$$

$$2^{n,cos} = -1^{n,cos} = a^{n,cos}. \quad (60)$$

or indeed:

$$2 = 2^0 + \quad (61)$$
$$\alpha \sum_{n=-\infty}^{+\infty}\sum_{m=-\infty}^{+\infty} \{2^{n,m,sin}\sin[(n\theta_1 + m\theta_2)x] + 2^{n,m,cos}\cos[(n\theta_1 + m\theta_2)x]\}$$

$$1 = 1^0 - \quad (62)$$
$$\alpha \sum_{n=-\infty}^{+\infty}\sum_{m=-\infty}^{+\infty} \{2^{n,m,sin}\sin[(n\theta_1 + m\theta_2)x] + 2^{n,m,cos}\cos[(n\theta_1 + m\theta_2)x]\}$$

where:

$$2^0 = 2^0 + \alpha a^0, \quad (63)$$

$$1^0 = 1^0 - \alpha a^0, \quad (64)$$

$$2^{n,m,sin} = -1^{n,m,sin} = b^{n,m,sin}, \quad (65)$$

$$2^{n,m,cos} = -1^{n,m,cos} = a^{n,m,cos}. \quad (66)$$

It is also possible to express the fluorescence intensity. Equation (67) defines the observable corresponding to observation at the wavelength $\lambda_j$ with $j=1$ or 2:

$$O_j(t) = Q_{1,j}1(t) + Q_{2,j}2(t) \quad (67)$$

Extracting the fluorescence emission $I_F(t)$ gives equation (68):

$$I_F(t) = O_1(t)I_1(t) + O_2(t)I_2(t). \quad (68)$$

Thus, with the time dependence given by equations (55) and (56):

$$O_j(t) = \mathfrak{O}_j^0 + \sum_{n=1}^{\infty}[\mathfrak{O}_j^{n,sin}\sin(n\theta x) + \mathfrak{O}_j^{n,cos}\cos(n\theta x)]. \quad (69)$$

with:

$$\mathfrak{O}_j^0 = Q_{1,j}1^0 + Q_{2,j}2^0 = Q_{1,j}1^0 + Q_{2,j}2^0 + (Q_{2,j} - Q_{1,j})\alpha a^0 \quad (70)$$

$$\mathfrak{O}_j^{n,sin} = (Q_{2,j} - Q_{1,j})\alpha b^{n,sin} \quad (71)$$

$$\mathfrak{O}_j^{n,cos} = (Q_{2,j} - Q_{1,j})\alpha a^{n,cos} \quad (72)$$

and $$I_F(t) = \mathfrak{I}_\mathfrak{F}^0 + \sum_{n=1}^{\infty}[\mathfrak{I}_\mathfrak{F}^{n,sin}\sin(n\theta x) + \mathfrak{I}_\mathfrak{F}^{n,cos}\cos(n\theta x)]. \quad (73)$$

Whereas the expressions for the amplitudes of the terms $O_j(t)$ are generic, the expressions for the amplitudes of the terms $I_F(t)$ vary with the time dependency of the illumination.

With the time dependencies $1(t)$ and $2(t)$ given by equations (61) and (62):

$$O_j(t) = \mathfrak{O}_j^0 + \quad (74)$$
$$\sum_{n=-\infty}^{+\infty}\sum_{m=-\infty}^{+\infty}\{\mathfrak{O}_j^{n,m,sin}\sin[(n\theta_1 + m\theta_2)x] + \mathfrak{O}_j^{n,m,cos}\cos[(n\theta_1 + m\theta_2)x]\}$$

with:

$$\mathfrak{O}_j^0 = Q_{1,j}1^0 + Q_{2,j}2^0 + (Q_{2,j} - Q_{1,j})\alpha a^0 \quad (75)$$

$$\mathfrak{O}_j^{n,m,sin} = (Q_{2,j} - Q_{1,j})\alpha b^{n,m,sin} \quad (76)$$

$$\mathfrak{O}_j^{n,m,cos} = (Q_{2,j} - Q_{1,j})\alpha a^{n,m,cos} \quad (77)$$

and $$I_F(t) = \quad (78)$$
$$\mathfrak{I}_\mathfrak{F}^0 + \sum_{n=-\infty}^{+\infty}\sum_{m=-\infty}^{+\infty}\{\mathfrak{I}_\mathfrak{F}^{n,m,sin}\sin[(n\theta_1 + m\theta_2)x] + \mathfrak{I}_\mathfrak{F}^{n,m,cos}\cos[(n\theta_1 + m\theta_2)x]\}.$$

in which, likewise, the expressions for the amplitudes of the terms $O_j(t)$ are generic, the expressions for the amplitudes of the terms $I_F(t)$ vary with the time dependency of the illumination.

The inventors first of all considered cases in which the modulations of the two amplitudes of the illuminating light beams are small, and denoted $\varepsilon$ instead of $\alpha$ below. This case allows the equations to be linearized and analytical expressions to be derived.

In prior-art embodiments, one of the two illuminating light beams is modulated sinusoidally (for example the illuminating light beam FEX1 at the wavelength $\lambda_1$, which oscillates about an average intensity $I_1^0$, at the angular frequency $\omega$ and with a small amplitude $\varepsilon I_1^0$ ($\varepsilon \ll 1$)) an illuminating light beam of constant intensity $I_2^0$ and of wavelength $\lambda_2$ being superposed therewith. Then:

$$I(t) = I_1^0[1 + \varepsilon \sin(\omega t)] + I_2^0 \quad (79)$$

$$h_1(t) = \sin(\omega t) \quad (80)$$

$$h_2(t) = 0. \quad (81)$$

Developing to the first order the expression for the luminous switching, equation (41) becomes:

$$\frac{df(\theta x)}{dx} = -f(\theta x) + a_1 h_1(\theta x) \quad (82)$$

After the relaxation time $\tau_{12}^0$ given by equation (11), it is possible to derive:

$$2^0 = 2^0 \quad (83)$$

$$1^0 = 1^0 \quad (84)$$

$$2^{1,sin} = -1^{1,sin} = \frac{a_1}{1+\theta^2} = \rho_{12}^0 \tau_{12}^0 \Delta_{12,1}^0 \frac{1}{1+(\omega\tau_{12}^0)^2} = \Delta_{12,1}^0 \frac{K_{12}^0}{(1+K_{12}^0)^2} \frac{1}{1+(\omega\tau_{12}^0)^2} P_{tot} \quad (85)$$

$$2^{1,cos} = -1^{1,cos} = -\frac{a_1\theta}{1+\theta^2} = -\rho_{12}^0 \tau_{12}^0 \Delta_{12,1}^0 \frac{\omega\tau_{12}^0}{1+(\omega\tau_{12}^0)^2} = -\Delta_{12,1}^0 \frac{K_{12}^0}{(1+K_{12}^0)^2} \frac{\omega\tau_{12}^0}{1+(\omega\tau_{12}^0)^2} P_{tot} \quad (86)$$

and:

$$\mathfrak{I}_s^0 = (Q_{1,1}1^0 + Q_{2,1}2^0)I_1^0 + (Q_{1,2}1^0 + Q_{2,2}2^0)I_2^0, \quad (87)$$

$$\mathfrak{I}_s^{1,sin} = \varepsilon\{(Q_{1,1}1^0 + Q_{2,1}2^0)I_1^0 + [(Q_{1,1} - Q_{2,1})I_1^0 + (Q_{1,2} - Q_{2,2})I_2^0]1^{1,sin}\} \quad (88)$$

$$\mathfrak{I}_s^{1,cos} = \varepsilon[(Q_{1,1} - Q_{2,1})I_1^0 + (Q_{1,2} - Q_{2,2})I_2^0]1^{1,cos}. \quad (89)$$

Using two different wavelengths, the exchanges between states 1 and 2 are essentially governed by the photochemical contributions if the average intensities $(I_1^0, I_2^0)$ are chosen so that: $\sigma_{21,1}I_1^0 + \sigma_{21,2}I_2^0 \gg k_{21}^\Delta$.

Figure 2:
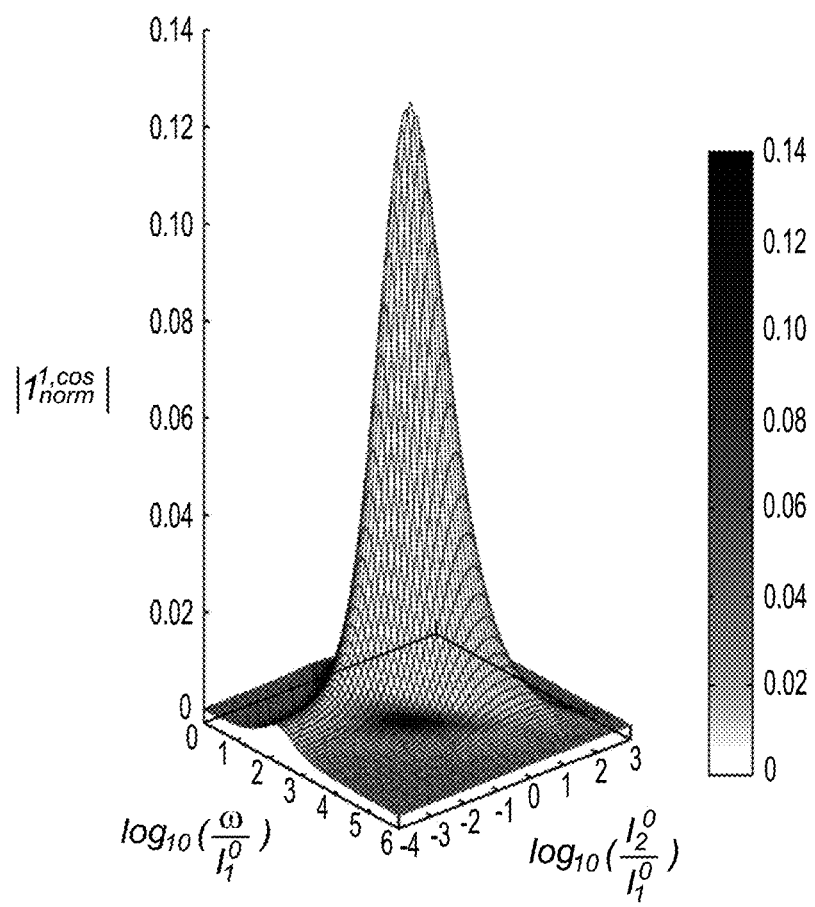
FIG. 2 illustrates a chart presenting a theoretical calculation of the response of a reversibly photoswitchable fluorescent species P in the case of an embodiment belonging to the prior art.

FIG. 2 shows a chart illustrating a theoretical calculation of the response of a reversibly photoswitchable fluorescent species P in the case of an embodiment belonging to the prior art. The chart of FIG. 2 illustrates the value of the normalized amplitude of the oscillations in phase quadrature for a concentration 1 ($|1_{norm}^{1,cos}|=|1^{1,cos}/P_{tot}|$), as a function of control parameters $I_2^0/I_1^0$ and $\omega/I_1^0$. This case corresponds to an illuminating light beam FEX1 of wavelength $\lambda_1$ oscillating about an average intensity $I_1^0$ at the angular frequency $\omega$ and with a small amplitude $\varepsilon I_1^0$ ($\varepsilon \ll 1$), with which an illuminating light beam of constant intensity $I_2^0$ and of wavelength $\lambda_2$ is superposed. The reversibly switchable fluorescent species P in question is "Dronpa-2", for which the inventors have measured the rate parameters, these corresponding to $\sigma_{12,1}=196$ m$^2$·mol$^{-1}$, $\sigma_{21,1}=0$ m$^2$·mol$^{-1}$, $\sigma_{12,2}=0$ m$^2$·mol$^{-1}$, $\sigma_{21,2}=413$ m$^2$·mol$^{-1}$ and $k_{21}^\Delta=1,4.10^{-2}$ s$^{-1}$, with $$I_1^0 = 100 \frac{k_{21}^\Delta}{\sigma_{12,1} + \sigma_{21,1}}.$$

In this case, $|1_{norm}^{1,cos}|$ has a single maximum when the two following conditions of resonance are met:

$$(\sigma_{12,1}+\sigma_{21,1})I_1^0 = (\sigma_{12,2}+\sigma_{21,2})I_2^0 \text{ and} \quad (90)$$

$$\omega = 2(\sigma_{12,1}+\sigma_{21,1})I_1^0. \quad (91)$$

This optimization results in an optimization that is independent of the terms $\alpha_1$ and $\theta/[(1+\theta^2]$ of equation (86). $\alpha_1$ corresponds to the variation $\Delta 2^0$ in the steady-state regime $2^0$ after an amplitude jump $\Delta I_1^0 = \varepsilon I_1^0$. It is maximized when the rate constants of the photochemical reactions induced by the two illuminating light beams are equal. The second optimized term, $\theta/[1+\theta^2]$, is maximized by adjusting the angular frequency $\omega$ to the relaxation time $\tau_{12}^0$ so as to obtain $\theta=1$. When $\omega \gg 1/\tau_{12}^0$, the exchange is slow with respect to variations in the illumination and the pair $\{1,2\}$ has no time to respond, so as to make the terms $i^{1,sin}$ and $i^{1,cos}$ disappear. In contrast, when $\omega \gg 1/\tau_{12}^0$, $i^{1,cos}$ cancels out and the concentrations 1 and 2 oscillate in phase with the modulation of the illumination. More generally, and in all the embodiments of the invention, the average intensity of said first illuminating light beam (FEX1), the average intensity of said second illuminating light beam (FEX2), and their angular frequency $\omega$ are chosen so as to maximize the amplitude of the intensity component of said fluorescence radiation (FLU) in phase quadrature with the first illuminating light beam.

In embodiments of the invention, the two illuminating light beams FEX1, FEX2 are modulated sinusoidally (or more generally periodically), at the same angular frequency $\omega$. The inventors have discovered that it is possible to increase the amplitude, to the first order, of the response to the illuminating modulations of a species P with respect to the case in which the second illuminating light beam excites a species P with a constant intensity. By way of example, I(t) is considered to comprise a superposition of two sinusoidal modulations of small amplitudes: on the one hand, at the wavelength $\lambda_1$ about the average intensity $I_1^0$ and at the angular frequency $\omega$, and on the other hand, at the wavelength $\lambda_2$ about the average intensity $I_2^0$ and at the angular frequency $\omega$. Thus:

$$I(t)=I_1^0[1+\varepsilon h_1(t)]+I_2^0[1+\varepsilon h_2(t)], \quad (92)$$

$$h_1(t)=\sin(\omega t), \quad (93)$$

$$h_2(t)=\sin(\omega t+\varphi) \quad (94)$$

with $\varepsilon \ll 1$.

Developing to the first order the switching caused by the illumination, $f(x)=f_1(\theta x)+f_2(\theta x)$ is a solution of equation (41) when $f_1(\theta x)$ and $f_2(\theta x)$ are solutions of the following equation (95):

$$\frac{df_j(\theta x)}{dx} = -f_j(\theta x) + a_j h_j(\theta x) \quad (95)$$

with j=1 or 2, respectively. It will be noted that this equation is similar to equation (82). After the relaxation time $\tau_{12}^0$ given by equation (11), it is possible to derive:

$$2^0 = 2^0, \quad (96)$$

$$1^0 = 1^0, \quad (97)$$

$$2^{1,sin} = -1^{1,sin} = \frac{a_1}{1+\theta^2} + \frac{a_2(\cos\varphi + \theta\sin\varphi)}{1+\theta^2}, \quad (98)$$

$$2^{1,cos} = -1^{1,cos} = -\frac{a_1\theta}{1+\theta^2} + \frac{a_2(\sin\varphi - \theta\cos\varphi)}{1+\theta^2} \quad (99)$$

For the species P used in the embodiments of the invention, nonlimitingly, the photochemically induced transition from the state 1 to that state 2 (or from state 2 to state 1, respectively) is governed exclusively by an illumination at the wavelength $\lambda_1$ (or $\lambda_2$, respectively). Considering the rate constant of the reaction that causes the transition from state 2 to state 1 to be mainly governed by photochemistry, it is possible to deduce that $a_1=-a_2$. Equations 98 and 99 become:

$$2^{1,sin} = -1^{1,sin} = \frac{a_1}{1+\theta^2}[(1-\cos\varphi) - \theta\sin\varphi], \quad (100)$$

$$2^{1,cos} = -1^{1,cos} = -\frac{a_1}{1+\theta^2}[\theta(1-\cos\varphi) + \sin\varphi] \quad (101)$$

Equations (100) and (101) show that $\varphi=\pi$ is typically favourable for increasing the amplitudes of the fluorescence response. Equations (100) and (101) then become:

$$2^{1,sin} = -1^{1,sin} = \frac{2a_1}{1+\theta^2} \quad (102)$$

$$2^{1,cos} = -1^{1,cos} = -\frac{2a_1\theta}{1+\theta^2} \quad (103)$$

and the terms of the fluorescence intensities are:

$$\mathcal{J}_{\tilde{s}}^0 = (Q_{1,1}1^0 + Q_{2,1}2^0)I_1^0 + (Q_{1,2}1^0 + Q_{2,2}2^0)I_2^0 \quad (104)$$

$$\mathcal{J}_{\tilde{s}}^{1,sin} = \varepsilon\{[(Q_{1,1}1^0 + Q_{2,1}2^0)I_1^0 - (Q_{1,2}1^0 + Q_{2,2}2^0)I_2^0]\} + \varepsilon\{[(Q_{1,1}-Q_{2,1})I_1^0 + (Q_{1,2}-Q_{2,2})I_2^0]1^{1,sin}\} \quad (105)$$

$$\mathcal{J}_{\tilde{s}}^{1,cos} = \varepsilon[(Q_{1,1}-Q_{2,1})I_1^0 + (Q_{1,2}-Q_{2,2})I_2^0]1^{1,cos}. \quad (106)$$

In particular, the inventors have discovered that the illumination variation corresponding to equation (92) with $\varphi=\pi$ produces, qualitatively, the same results for $\mathcal{J}_{\tilde{s}}^{1,cos}$ as a luminous excitation governed by equation (79) but with an amplitude that, in theory, is two times higher. This increase in amplitude allows a number of prior-art technical problems to be solved as it allows a species P obeying the resonance conditions given by equations (90) and (91) to be selectively imaged with a higher temporal resolution and a higher signal-to-noise ratio. More generally, in all of the embodiments of the invention, in which embodiments a first illuminating light beam FEX1 is modulated periodically at an angular frequency $\omega$ and a second illuminating light beam is modulated periodically at the same angular frequency $\omega$, the second illuminating light beam FEX2 is modulated in antiphase, i.e. at $\varphi=\pi$ with respect to the first illuminating light beam FEX1.

Figure 3:
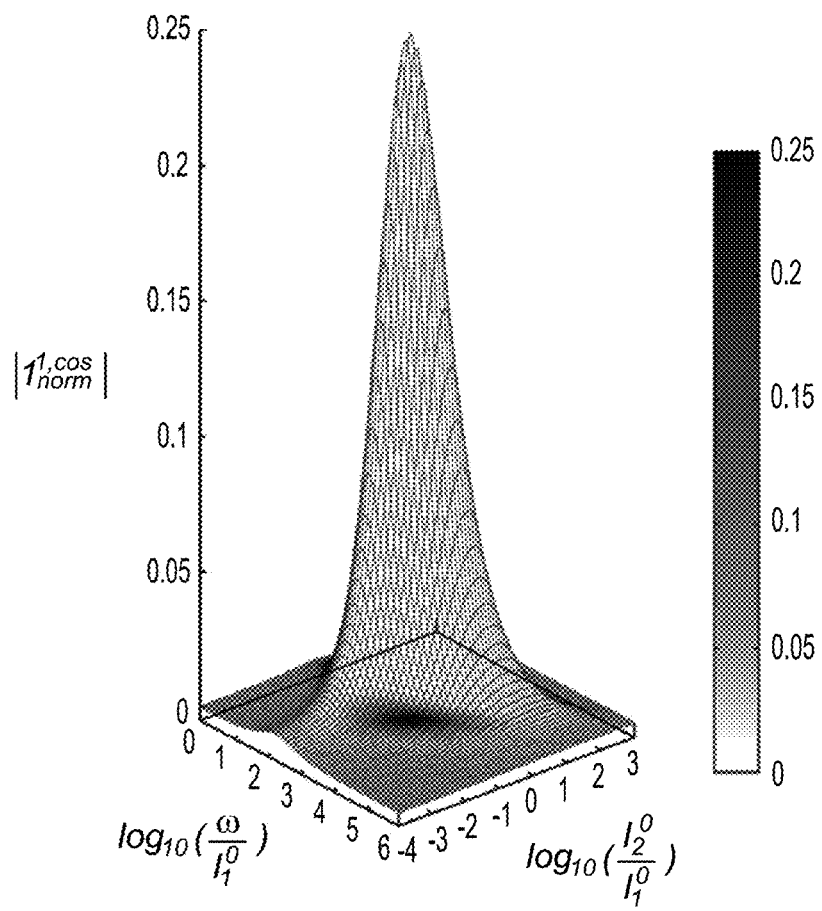
FIG. 3 illustrates a chart presenting a theoretical calculation of the response of a reversibly photoswitchable fluorescent species in an embodiment of the invention.

FIG. 3 shows a chart illustrating a theoretical calculation of the response of a reversibly photoswitchable fluorescent species P in an embodiment of the invention. The chart of FIG. 3 illustrates the value of the normalized amplitude of the oscillations in phase quadrature for a concentration 1 ($|1_{norm}^{1,cos}|=|1^{1,cos}/P_{tot}|$), as a function of control parameters $I_2^0/I_1^0$ and $\omega/I_1^0$. This case corresponds to an illuminating light beam FEX1 of wavelength $\lambda_1$ oscillating about an average intensity $I_1^0$ at the angular frequency $\omega$ and with a small amplitude $\varepsilon I_1^0$ ($\varepsilon<1$), with which an illuminating light beam FEX2 of wavelength $\lambda_2$ oscillating about an average intensity $I_2^0$ at the angular frequency $\omega$ and with a small amplitude $\varepsilon I_2^0$ ($\varepsilon<1$), is superposed. The other parameters are similar to the parameters used in the embodiment corresponding to FIG. 2. In this case, $|1_{norm}^{1,cos}|$ has a single maximum when the two conditions of resonance, corresponding to equations (90) and (91), are met, as in the embodiment illustrated in FIG. 2, but the norm of which is substantially two times higher, this resulting in an increase of a factor of 4 in the signal-to-noise ratio. The signal-to-noise ratio could be considered a signal-to-interference (SIR) ratio.

Figure 4:
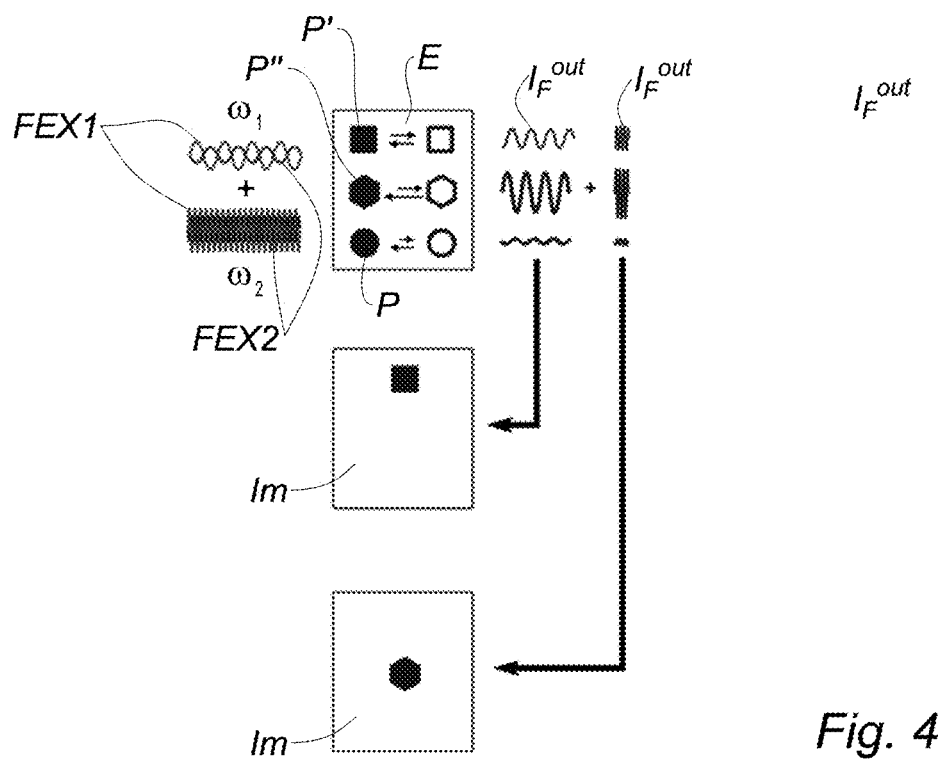
FIG. 4 illustrates an embodiment of the invention allowing a plurality of reversibly photoswitchable fluorescent species to be imaged in the same image detection.

FIG. 4 illustrates an embodiment of the invention allowing a plurality of reversibly photoswitchable fluorescent species to be imaged during the same image detection. In this embodiment of the invention, a first illuminating light beam FEX1 of wavelength $\lambda_1$ is modulated periodically with a first function summing at least two first illuminating components that are modulated with angular frequencies $\omega_i$, the angular frequencies being different from one another. In the nonlimiting example illustrated in FIG. 4, the first illuminating light beam FEX1 is modulated with a function summing an angular-frequency component $\omega_1$ and an angular-frequency component $\omega_2$. Each of the angular frequencies $\omega_i$ is associated, or corresponds, to a reversibly photoswitchable fluorescent species of the imaged sample E. In the case illustrated in FIG. 4, the angular frequency $\omega_1$ corresponds to the species P represented by a solid square and an open square, and the angular frequency $\omega_2$ corresponds to the species P' represented by a solid hexagon and an open hexagon. The species P" represented by a circle corresponds to no particular angular frequency. The sample is also illuminated with a second illuminating light beam FEX2 of wavelength $\lambda_2$, which is modulated periodically with a second function summing at least two first illuminating components that are modulated with the same angular frequencies $\omega_i$, i.e. in the nonlimiting case of FIG. 4, with the angular frequencies $\omega_1$ and $\omega_2$.

Analytically, it is possible to consider, nonlimitingly, the illuminating intensity I(t) to be a superposition of two small-amplitude sinusoidal modulations, at the angular frequencies $\omega_1$ and $\omega_2$, which oscillate about an average intensity $I_1^0$, at the wavelength $\lambda_1$, and about an average intensity $I_2^0$, at the wavelength $\lambda_2$. In other embodiments of the invention, the modulations may be periodic, of different forms, and of larger amplitude. It is considered that:

$$I(t)=I_1^0[1+\varepsilon h_1(t)]+I_2^0[1+\varepsilon h_2(t)], \quad (121)$$

$$h_1(t)=\sin(\omega_1 t)+\beta \sin(\omega_2 t), \quad (122)$$

$$h_2(t)=-\sin(\omega_1 t)-\beta \sin(\omega_2 t), \quad (123)$$

with $\varepsilon\ll 1$. In this case, $I_1^0[1+\varepsilon h_1(t)]$ corresponds to a first function and $I_2^0[1+\varepsilon h_2(t)]$ corresponds to a second function.

Developing to the first order the switching caused by the illumination, $f(x)=f_1(\theta_1 x)+\beta f_2(\theta_2 x)$ is a solution of equation (41) when $f_1(\theta_1 x)$ and $f_2(\theta_2 x)$ are solutions of the following equation (124):

$$\frac{df_j(\theta_j x)}{dx} = -f_j(\theta_j x) + (a_1 - a_2)\sin(\theta_j x) \quad (124)$$

with j=1 or 2, respectively. After the relaxation time $\tau_{12}^0$, it is possible to derive:

$$2^0 = 2^0, \quad (125)$$

$$1^0 = 1^0, \quad (126)$$

$$2^{1,0,sin} = -1^{1,0,sin} = \frac{(a_1 - a_2)}{1+\theta_1^2}, \quad (127)$$

$$2^{1,0,cos} = -1^{1,0,cos} = -\frac{(a_1 - a_2)\theta_1}{1+\theta_1^2}, \quad (128)$$

-continued $$2^{0,1,sin} = -1^{0,1,sin} = \beta\frac{(a_1-a_2)}{1+\theta_2^2} \text{ and} \tag{129}$$

$$2^{0,1,cos} = -1^{0,1,cos} = -\beta\frac{(a_1-a_2)\theta_2}{1+\theta_2^2} \tag{130}$$

Equations (127) to (130) lead to:

$$2^{1,0,sin} = \tag{131}$$
$$-1^{1,0,sin} = \frac{\rho_{12}^0 \tau_{12}^0 (\Delta_{12,1}^0 - \Delta_{12,2}^0)}{1+(\omega_1\tau_{12}^0)^2} = \frac{K_{12}^0}{(1+K_{12}^0)^2}\frac{(\Delta_{12,1}^0-\Delta_{12,2}^0)}{1+(\omega_1\tau_{12}^0)^2}P_{tot}$$

$$2^{1,0,cos} = -1^{1,0,cos} = -\frac{\omega_1\tau_{12}^0\rho_{12}^0\tau_{12}^0(\Delta_{12,1}^0-\Delta_{12,2}^0)}{1+(\omega_1\tau_{12}^0)^2} = \tag{132}$$
$$-\frac{K_{12}^0}{(1+K_{12}^0)^2}\frac{\omega_1\tau_{12}^0(\Delta_{12,1}^0-\Delta_{12,2}^0)}{1+(\omega_1\tau_{12}^0)^2}P_{tot}$$

$$2^{0,1,sin} = -1^{0,1,sin} = \tag{133}$$
$$\beta\frac{\rho_{12}^0\tau_{12}^0(\Delta_{12,1}^0-\Delta_{12,2}^0)}{1+(\omega_2\tau_{12}^0)^2} = \beta\frac{K_{12}^0}{(1+K_{12}^0)^2}\frac{(\Delta_{12,1}^0-\Delta_{12,2}^0)}{1+(\omega_2\tau_{12}^0)^2}P_{tot}$$

$$2^{0,1,cos} = -1^{0,1,cos} = -\beta\frac{\omega_2\tau_{12}^0\rho_{12}^0\tau_{12}^0(\Delta_{12,1}^0-\Delta_{12,2}^0)}{1+(\omega_2\tau_{12}^0)^2} = \tag{134}$$
$$-\beta\frac{K_{12}^0}{(1+K_{12}^0)^2}\frac{\omega_2\tau_{12}^0(\Delta_{12,1}^0-\Delta_{12,2}^0)}{1+(\omega_2\tau_{12}^0)^2}P_{tot}$$

and the terms associated with the oscillating fluorescence emissions are:

$$\mathfrak{I}_\mathfrak{F}^0 = (Q_{1,1}1^0 + Q_{2,1}2^0)I_1^0 + (Q_{1,2}1^0 + Q_{2,2}2^0)I_2^0, \tag{135}$$

$$\mathfrak{I}_\mathfrak{F}^{1,0,sin} = \varepsilon\{(Q_{1,1}1^0 + Q_{2,1}2^0)I_1^0 - (Q_{1,2}1^0 + Q_{2,2}2^0)I_2^0\} + \varepsilon\{[(Q_{1,1}-Q_{2,1})I_1^0 + (Q_{1,2}-Q_{2,2})I_2^0]1^{1,0,sin}\}, \tag{136}$$

$$\mathfrak{I}_\mathfrak{F}^{1,0,sin} = \varepsilon[(Q_{1,1}-Q_{2,1})I_1^0 + (Q_{1,2}-Q_{2,2})I_2^0]1^{1,0,cos}, \tag{137}$$

$$\mathfrak{I}_\mathfrak{F}^{1,0,sin} = \varepsilon\beta\{(Q_{1,1}1^0 + Q_{2,1}2^0)I_1^0 - (Q_{1,2}1^0 + Q_{2,2}2^0)I_2^0\} + \varepsilon\{[(Q_{1,1}-Q_{2,1})I_1^0 + (Q_{1,2}-Q_{2,2})I_2^0]1^{0,1,sin}\} \text{ and} \tag{138}$$

$$\mathfrak{I}_\mathfrak{F}^{1,0,sin} = \varepsilon[(Q_{1,1}-Q_{2,1})I_1^0 + (Q_{1,2}-Q_{2,2})I_2^0)]1^{0,1,cos}. \tag{139}$$

In this embodiment, the fluorescence response of the sample E to the superposition of two small-amplitude anti-phase modulations at two different angular frequencies $\omega_1$ and $\omega_2$ allows the embodiments of the invention corresponding to FIGS. 1 and 3 to be used to simultaneously and selectively detect two species P' and P''. Advantageously, the photoswitchable species share identical resonance conditions in terms of illuminating intensity $I_1^0$ and $I_2^0$, these conditions corresponding to equation (90). Advantageously, each of the photoswitchable species is associated with angular frequencies $\omega_1$ and $\omega_2$ such as defined in equation (91), and corresponding to the resonant angular frequencies of each of these species P' and P''. In particular, the fluorescence expressions derived in equations (136) and (137) are similar to equation (107), but with an amplitude that is two times higher in the particular case of this embodiment of the invention, in which $\alpha_1=\alpha_2$, allowing selective and simultaneous detection of two separate species P' and P'''.

Advantageously, the periodic modulations applied to the intensities of the first illuminating light beam FEX1 and of the second illuminating light beam FEX2 are not small with respect to the average intensity of these illuminating light beams. They may for example be of the same order of magnitude. In the case of large-amplitude periodic modulations of the intensities of the illuminating light beams FEX1, FEX2, i.e. in the case where $\alpha<1$, the inventors have discovered that the conditions described above remain valid. These validations were carried out by numerically calculating the various orders of truncated Fourier series the corresponding functions of which were linearized in the preceding cases considering small-amplitude intensity modulation.

The arrows of FIG. 4 illustrate various images Im obtained after post-processing of the intensity signal $I_F^{out}$. These images Im may be obtained by demodulating the acquired signal associated with the angular frequency $\omega_i$ corresponding to the reversibly photoswitchable species of interest.

Figure 5:
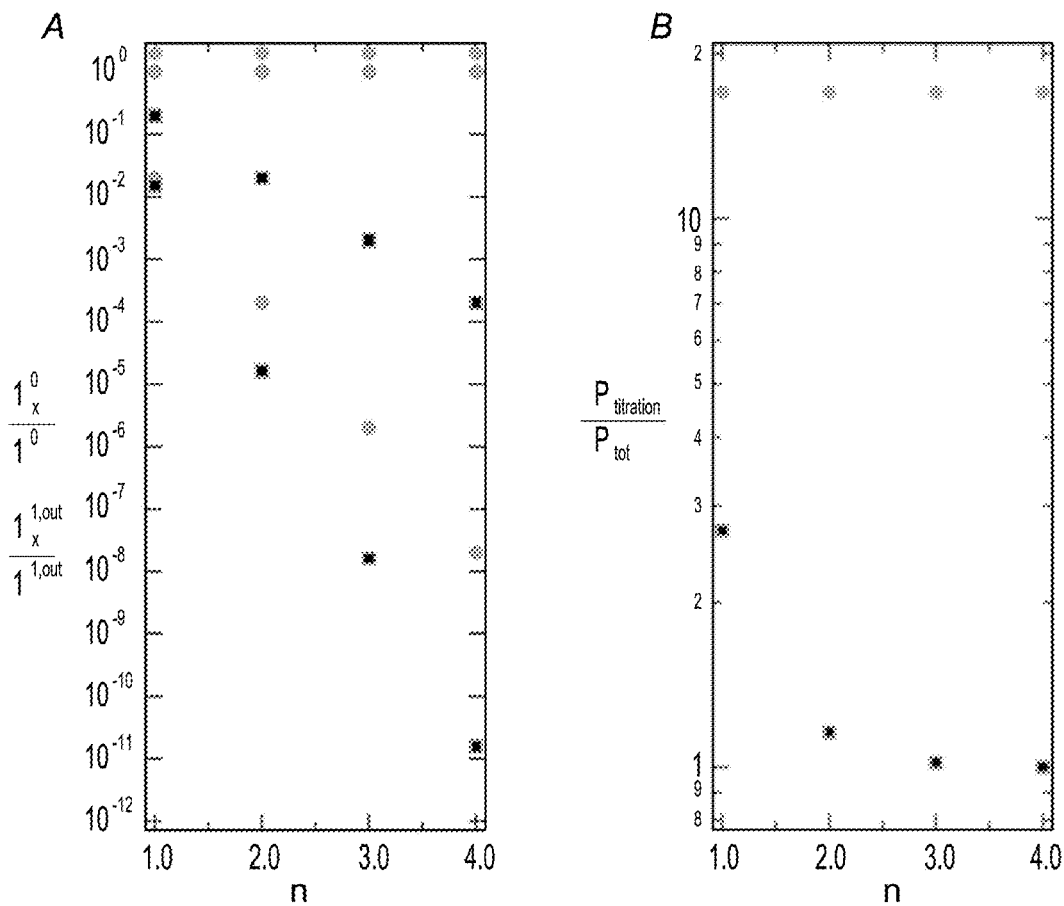
FIG. 5 illustrates a numerical simulation corresponding to the quantification of a reversibly photoswitchable fluorescent species in the presence of interfering compounds X.

FIG. 5 illustrates a numerical simulation corresponding to the quantification of a species P in the presence of interfering compounds X. In the absence of information on the various fluorescent species present in a sample, it is possible to optimize the first-order phase-quadrature fluorescence response $I_F^{out}$ by choosing a triplet $(I_1^0, I_2^0, \omega)$ that meets the resonance conditions given in equations (90) and (91), so as to selectively and qualitatively image one species P among the interfering species X, the latter being defined by the set of parameters $(\sigma_{12,1,X}, \sigma_{21,1,X}, \sigma_{12,2,X}, \sigma_{21,2,X}, k_{21,X}^\Delta)$ and of total concentration $X_{tot}$. A species X may, in this case, not be photoswitchable, this case corresponding to the parameters $\sigma_{12,i,X}=\sigma_{21,i,X}=0$ (for i=1 or 2) and $k_{21,X}^\Delta=0$.

FIG. 5 illustrates the case of a mixture of reversibly switchable fluorophore species P only the state 1 of which emits by fluorescence, said species being characterized by the same brightness $Q_{1,j}$. In this case, a protocol consisting in illuminating, at constant intensities $I_i^0$, gives a signal $I_F^0$ proportional to the sum of the contributions of the various fluorophores, such that:

$$I_F^0 \propto 1_P^0 + \sum_X 1_X^0 = (1_P^0/P_{tot})P_{titration}^0 \tag{223}$$

where:

$$P_{titration}^0 = P_{tot} + \sum_X \frac{(1_X^0/X_{tot})}{(1_P^0/P_{tot})}X_{tot} > P_{tot}. \tag{224}$$

When the signal $I_F^0$ is used to titrate the species P, the result of the titration overestimates the total concentration because of the contributions of the interfering species. In contrast, the first-order phase-quadrature response to the illumination $\mathfrak{I}_\mathfrak{F}^{1,cos}$ may be expressed:

$$\mathfrak{I}_\mathfrak{F}^{1,cos} \propto 1_P^{1,cos} + \sum_X 1_X^{1,cos} = (1_P^{1,cos}/P_{tot})P_{titration}^{1,cos} \tag{225}$$

where $$P_{titration}^{1,cos} = P_{tot} + \sum_X \frac{(1_X^{1,cos}/X_{tot})}{(1_P^{1,cos}/P_{tot})}X_{tot} \tag{226}$$

and allows $P_{tot}$ to be determined when the triplet of parameters $(I_1^0, I_2^0, \omega)$ is adjusted under the conditions of resonance for a species P. Specifically, the term $1_P^{1,cos}$ is maximum whereas the terms $1_X^{1,cos}$ are negligible. The signal generated by the species P is predominant with respect to that of the other interfering species, and the titration result $P_{titration}^{1,cos}$ is approximately equal to $P_{tot}$.

Panel A of FIG. 5 illustrates a numerical simulation of the normalized amplitudes $1_X^0/1_P^0$ (illustrated by the gray disks) and of the normalized amplitudes of $1_X^{1,cos}/1_P^{1,cos}$ (illustrated by the black squares) for four equimolar mixtures including the target species characterized by the quintuplet $(\sigma_{12,1}, \sigma_{21,1}, \sigma_{12,2}, \sigma_{21,2}, k_{21}^A)$ and sixteen other interfering species. In each sample marked n, these interfering species correspond to sixteen quintuplets the four photochemical parameters of which differ by n orders of magnitude from $(\sigma_{12,1}, \sigma_{21,1}, \sigma_{12,2}, \sigma_{21,2})$.

Figure 6:
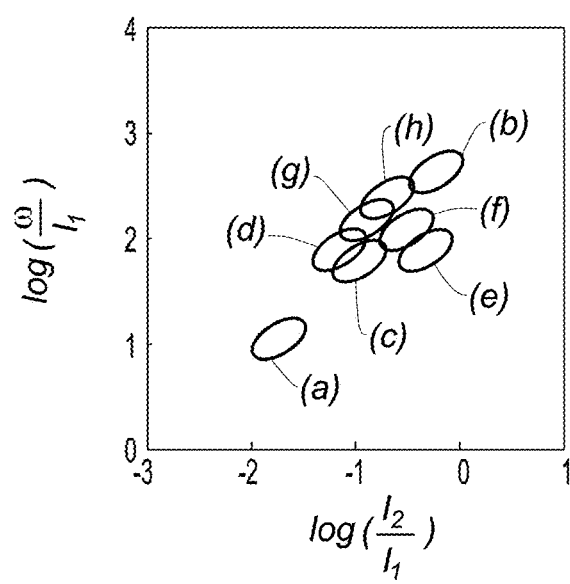
FIG. 6 is a graph illustrating photochemical properties of a set of reversibly photoswitchable fluorescent species.

FIG. 6 illustrates the photochemical properties of a set of reversibly photoswitchable fluorescent species. For each of the species in question, the conditions of resonance according to equations (90) and (91) have been measured and are illustrated by iso-curves of the absolute value of the normalized amplitude of the first-order phase-quadrature fluorescence response. Curve (a) corresponds to the species "Dronpa", curve (b) corresponds to the species "Dronpa-2", curve (c) corresponds to the species "Dronpa-3", curve (d) corresponds to the species "RS-FastLime", curve (e) corresponds to the species "Padron", curve (f) corresponds to the species "Kohinoor", curve (g) corresponds to the species "rsEFGP" and curve (h) corresponds to the species "rsEFGP2".

In one of the embodiments of the invention, the sample E is illuminated with two illuminating light beams of different wavelengths, and each of the illuminating light beams is periodically modulated in order to image a plurality of reversibly photoswitchable species selectively, as illustrated in FIG. 4, the triplet $I_1^0$, $I_2^0$, $\omega_i$ being chosen for each of the species so as to maximize the component $I_F^{out}$ of the fluorescence radiation.

In one particular embodiment, the conditions of resonance set by the two average intensities of the illuminating light beams, i.e. by the relationship $(\sigma_{12,1}+\sigma_{21,1})I_1^0=(\sigma_{12,2}+\sigma_{21,2})I_2^0$, are employed. Graphically, this solution consists in imaging two reversibly photoswitchable species the conditions of resonance of which may be illustrated by points that are substantially close to the same vertical line in FIG. 6.

One variant of the invention consists in employing these conditions and choosing two frequencies $\omega_1$ and $\omega_2$ (in the case of detection of two species P' and P'') meeting the conditions of resonance of each of the species. In other words, each angular frequency a meets the condition $\omega=2(\sigma_{12,1}+\sigma_{21,1})I_1^0$. This embodiment allows the amplitude of each first-order phase-quadrature fluorescence response $I_F^{out}$ to be maximized.

Another variant of the invention consists in employing conditions respecting the relationship $(\sigma_{12,1}+\sigma_{21,1})I_1^0=(\sigma_{12,2}+\sigma_{21,2})I_2^0$, and in choosing two angular frequencies to modulate the illuminating light beams, each of these angular frequencies being associated with one reversibly photoswitchable species and the ratio of said angular frequencies being, for example, strictly higher than 10 and preferably higher than 100. Specifically, when the relationship (90) is respected, the ratio of the resonant angular frequencies specific to two species P' and P''' may be low, for example lower than 10. In this case, if conditions meeting relationship (91) are employed, the amplitude $I_F^{out}$ corresponding to each species is maximized, but the contribution of interference to an amplitude associated with a given species prevents an optimal contrast from being obtained between the species. It is possible, in this variant, to use relationship (106) to choose the angular frequencies used to modulate the illuminating light beams FEX1, FEX2 so as to obtain a ratio between the angular frequencies that is higher than a predefined value, for example 10, in order to increase the contrast.

More generally, it is possible to depart from the maximum amplitude of the fluorescence signal in order to increase the contrast with respect to one or more interfering species. It is for example possible to maximize the amplitude of the fluorescence under the constraint of obtaining a minimum contrast, to maximize the contrast provided a minimum amplitude (generally expressed in percent of the maximum amplitude) is obtained, or even to determine a region of the parameter space $((\omega/I_1, I_1/I_2)$ ensuring both a sufficiently high amplitude and a sufficiently high contrast are obtained. Likewise, in the case where it is sought to detect a single fluorescent species, it may be advantageous to depart from the conditions of resonance in order to improve the contrast with the interfering fluorescent species, at the price of a decrease in the amplitude of the signal. Most often however, illumination conditions that ensure that the amplitude of the signal is equal to at least 75%, preferably 80% and even more preferably 90% of the maximum achievable signal will be chosen.

Figure 7:
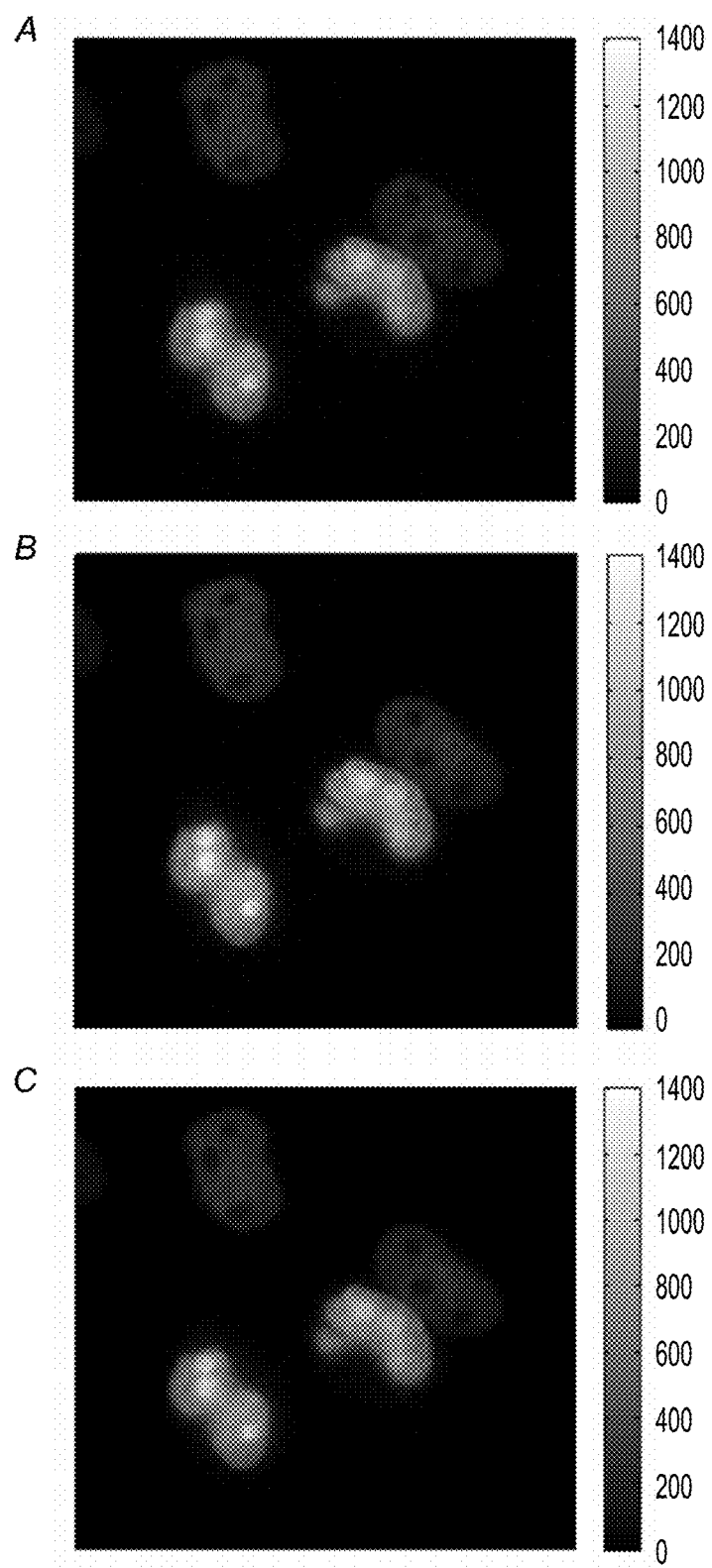
FIG. 7 is a set of photographs illustrating an experimental comparison between embodiments of the prior art and an embodiment of the invention.

FIG. 7 is a set of photographs illustrating an experimental comparison between embodiments of the prior art and an embodiment of the invention.

Panel A of FIG. 7 is a photograph illustrating cell nuclei marked with a species P. The photograph was taken, using a prior-art method, by imaging the signal $I_F^{out}$ generated with a first illuminating light beam of wavelength $\lambda_1=480$ nm, which was periodically modulated, and with a second illuminating light beam of wavelength $\lambda_2=405$ nm, the intensity of which remained constant.

Panel B of FIG. 7 is a photograph illustrating the same cell nuclei marked with the same species P. The photograph was taken using a prior-art method, by imaging the signal $I_F^{out}$ generated with a first illuminating light beam of wavelength $\lambda_1=480$ nm, the intensity of which remained constant, and with a second illuminating light beam of wavelength $\lambda_2=405$ nm, which was periodically modulated.

Panel C of FIG. 7 is a photograph illustrating the same cell nuclei marked with the same species P. The photograph was taken using a method according to the invention, by imaging the signal $I_F^{out}$ generated with a first illuminating light beam of wavelength $\lambda_1=480$ nm, which was periodically modulated, and with a second illuminating light beam of wavelength $\lambda_2=405$ nm, which was modulated with the same period and in antiphase.

In panel A of FIG. 7, the intensities have been multiplied by two. In panel B of FIG. 7, the intensities have been multiplied by −2. The peak intensities are substantially equal in all the panels of the figure, illustrating the increase in the signal achieved, as illustrated in FIG. 3, when an embodiment employing two illuminating light beams that are periodically modulated in antiphase is used, compared to when only one periodically modulated illuminating beam or one periodically modulated illuminating beam and a second illuminating beam of constant intensity is/are used. The amplitude $I_F^{out}$ measured in prior-art embodiments and/or in embodiments of the invention is algebraic: the absolute values and/or the signs of the measured $I_F^{out}$ may be used to differentiate between them.

Figure 8:
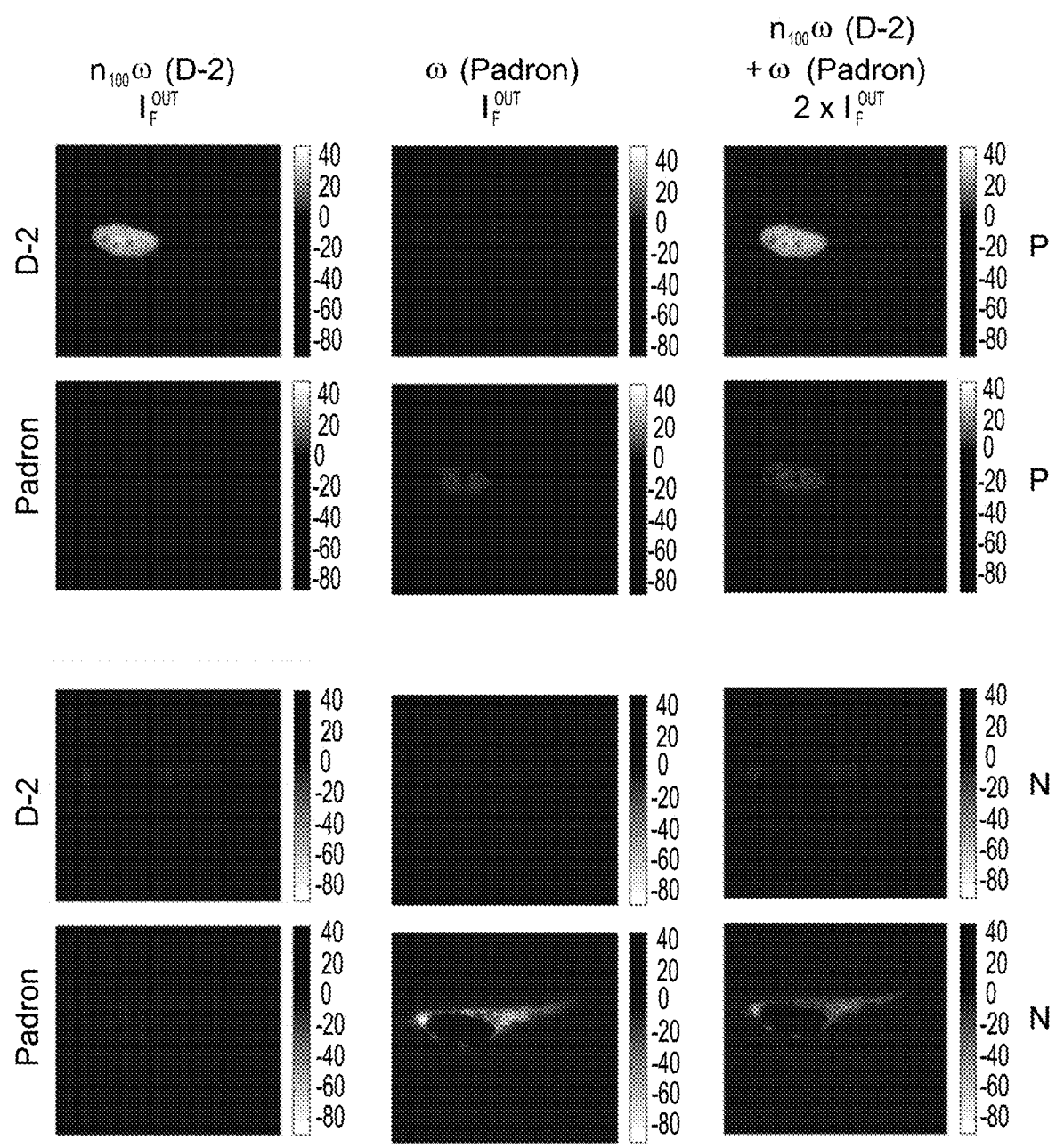
FIG. 8 illustrates detection of the fluorescence image of a cell according to one embodiment of the invention.

FIG. 8 illustrates detection of the fluorescence image of a cell according to one embodiment of the invention. In this example, the nucleus of the cell has been marked with a species P, in the present case "Dronpa-2". The mitochondria of the cell have been marked with another species P' "Padron". The species P' "Padron" is characterized by a dark state 1 and a fluorescent state 2. In this example, two modulation angular frequencies were employed. The ratio between the two modulation angular frequencies was set to 100. A first angular frequency, $n_{100}\omega(D-2)$, was associated with the species P' "Dronpa-2"; this angular frequency was higher than the resonant angular frequency of "Dronpa-2". A second angular frequency, $\omega(\text{Padron})$, was associated with the species P" "Padron"; this angular frequency was lower than the resonant angular frequency of "Padron". The legends "Padron" and "D-2" on the left of the images indicate a demodulation of the fluorescence signal at the angular frequency associated with "Padron" and with "Dronpa-2", respectively. The legends "P" and "N" on the right of the images indicate that the amplitude of $I_F^{out}$ shown is of positive sign (P) or negative sign (N), respectively.

The left-hand column of FIG. 8 illustrates images obtained according to one embodiment of the invention, the cell being illuminated with two illuminating light beams of different wavelengths, said light beams being modulated in antiphase at the angular frequency $n_{100}\omega(D-2)$. The nucleus of the cell is significantly visible in the image corresponding to a positive amplitude of $I_F^{out}$ and to a demodulation at the angular frequency corresponding to D-2.

The middle column of FIG. 8 illustrates images obtained according to one embodiment of the invention, the cell being illuminated with two illuminating light beams FEX1, FEX2 of different wavelengths, said light beams being modulated in antiphase, at the angular frequency $\omega(\text{Padron})$. The mitochondria of the cell are significantly visible in the image corresponding to a negative amplitude of $I_F^{out}$ and to a demodulation at the angular frequency corresponding to Padron.

The right-hand column of FIG. 8 illustrates images obtained according to one embodiment of the invention, the cell being illuminated with two illuminating light beams FEX1, FEX2 of different wavelengths, said light beams being modulated with components at the angular frequencies $n_{100}\omega(D-2)$ and $\omega(\text{Padron})$, each component of the second illuminating light beam FEX2 being in antiphase with the corresponding component of the first illuminating light beam FEX1. The nucleus of the cell is significantly visible in the image corresponding to a positive amplitude of $I_F^{out}$ and to a demodulation at the angular frequency corresponding to D-2, and the mitochondria of the cell are significantly visible in the image corresponding to a negative amplitude of $I_F^{out}$ and to a demodulation at the angular frequency corresponding to Padron.

Figure 9:
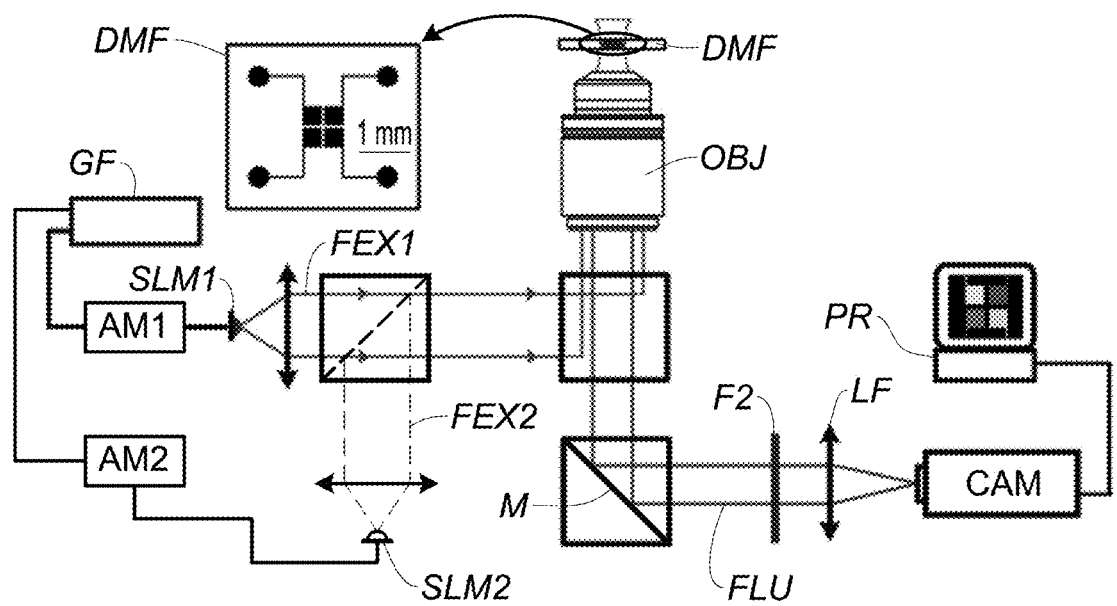
FIG. 9 illustrates a system implementing a method according to one embodiment of the invention.

FIG. 9 illustrates a system implementing a method according to one embodiment of the invention. This system, which is illustrated by way of nonlimiting example, comprises two light sources SLM1 and SLM2 that each consist of a light-emitting diode. The light source SLM1 is supplied with power by a power source AM1 and the light source SLM2 is supplied with power by a power source AM2. The modulation of each of the light sources SLM1 and SLM2 is obtained by modulating the respective supplied electrical power by means of a function generator GF having two independent outputs. Since the emission of the light-emitting diodes is wideband, the beams FEX1 and FEX2, emitted by SLM1 and SLM2, respectively, are collimated by lenses, then filtered by two optical filters before being directed onto a sample consisting of a microfluidic device DMF; for the sake of simplicity, the optical filters have not been shown in the figure. The illuminated sample is observed, via its back side, with an objective OBJ that collects the fluorescence radiation and focuses it into a beam FLU. The latter is filtered (filter F2) and directed, via a mirror M and a lens LF, onto the sensor of a video camera CAM. A computer comprises a processor PR that controls the video camera CAM so as to detect in phase quadrature, such as described above. Advantageously, the acquisition frequency of the video camera is commensurable with the modulation frequency of the sources FEX1, FEX2. To achieve a simple detection and/or simple titration, without imaging, the video camera CAM may be replaced by a point light sensor.

The invention claimed is:

1. A method for detecting at least one reversibly photoswitchable fluorescent species, including the following steps:
   (a) illuminating a sample containing said at least one said reversibly photoswitchable fluorescent species with a first illuminating light beam, of wavelength $\lambda_1$, and periodically modulated at an angular frequency $\omega$, and with a second illuminating light beam, of $\lambda_2$ different from $\lambda_1$, periodically modulated at said angular frequency $\omega$;
   (b) detecting fluorescence radiation emitted by said sample thus illuminated; and
   (c) extracting the amplitude ($I_F^{out}$) from the component of the intensity of said fluorescence radiation that has the same periodicity as said periodically modulated first illuminating light beam and that is in phase quadrature therewith;
   said second illuminating light beam being modulated in antiphase with respect to said first illuminating light beam; and
   the average intensity of said first illuminating light beam, the average intensity of said second illuminating light beam, and their angular frequency $\omega$ being chosen so as to get close to a maximum of said amplitude of the intensity component of said fluorescence radiation.

2. The method as claimed in claim 1, wherein at least one said reversibly photoswitchable fluorescent species has a first and second chemical state, at least one of said states being fluorescent, said or each said reversibly photoswitchable fluorescent species being capable of being converted from said first state to said second state via a first photo-induced reaction, then of returning to said first state via a second photo-induced reaction, and wherein said first illuminating light beam has an average intensity $I_1^0$ and is modulated at an angular frequency $\omega$ and said second illuminating light beam has an average intensity $I_2^0$ with:

$$(\sigma_{12,1}+\sigma_{21,1})I_1^0=(\sigma_{12,2}+\sigma_{21,2})I_2^0$$

$$\omega=2(\sigma_{12,1}+\sigma_{21,1})I_1^0$$

where $\sigma_{12,1}I_1^0$ and $\sigma_{21,1}I_1^0$ are the rate constants of said first and said second reactions photo-induced by said first illuminating light beam, respectively; and where $\sigma_{12,2}I_2^0$ and $\sigma_{21,2}I_2^0$ are the rate constants of said first and said second reactions photo-induced by said second illuminating light beam, respectively.

3. The method as claimed in claim 1, wherein the average intensity of said first illuminating light beam, the average intensity of said second illuminating light beam, and their angular frequency $\omega$ are also chosen so as to ensure a minimum contrast between said amplitude of the intensity component of said fluorescence radiation and the amplitude of a fluorescence intensity component having the same periodicity generated by an interfering species.

4. The method as claimed in claim 1, wherein, in said step a), said sample is illuminated by at least one substantially monochromatic illuminating light beam.

5. The method as claimed in claim 1, wherein said steps b) and c) are implemented via synchronous detection of said fluorescence radiation.

6. The method as claimed in claim 1, also including the following step:
   d) determining the concentration of said or at least one said reversibly photoswitchable fluorescent species from the component of the intensity of said fluorescence radiation which is extracted in said step c).

7. The method as claimed in claim 1, wherein said or at least one said reversibly photoswitchable fluorescent species is chosen from:
   a photochromic fluorescent protein; and
   a complex of a biomolecule with a fluorogenic probe.

8. The method as claimed in claim 1, wherein the sample contains biological material.

9. The method as claimed in claim 1, wherein a said illuminating light beam comprises an amount of daylight and wherein said amount of daylight is included in the light intensity received by said reversibly photoswitchable fluorescent species but remains less than or equal to the average intensities of said illuminating light beams.

10. A fluorescence-imaging method implementing a detecting method as claimed in claim 1.

11. The method as claimed in claim 10, wherein said sample may comprise a living organism, and wherein at least one element chosen from the presence and concentration of a said reversibly photoswitchable fluorescent species is measured on the basis of the component of the intensity of said fluorescence radiation which is extracted in said step c), without taking a sample of said living organism.

12. A method for detecting at least two reversibly photoswitchable fluorescent species having different dynamic properties, including the following steps:
   (a) illuminating a sample containing each said reversibly photoswitchable fluorescent species with a first illuminating light beam of wavelength $\lambda_1$ and periodically modulated with a first function summing at least two first illuminating components that are modulated with angular frequencies $\omega i$, each said angular frequency $\omega i$ of each said first illuminating component being associated with one said reversibly photoswitchable fluorescent species, and being different from the one or more other said angular frequencies $\omega i$; and
   illuminating the sample with a second illuminating light beam, of wavelength $\lambda_2$ different from $\lambda_1$, and periodically modulated with a second function summing at least two second illuminating components that are modulated with said angular frequencies $\omega i$, each said angular frequency $\omega i$ of each said second illuminating component being equal to a said angular frequency $\omega i$ of a said first illuminating component;
   (b) detecting fluorescence radiation emitted by said sample thus illuminated;
   (c) extracting each amplitude ($I_F^{out}$) of the component of the intensity of said fluorescence radiation that has the same angular frequency $\omega i$ as each said illuminating component, and that is in phase quadrature with each said first illuminating component;
      for each said angular frequency $\omega_i$, each said second illuminating component modulated with said angular frequency $\omega_i$ being in antiphase with respect to each said first illuminating component modulated with said angular frequency $\omega_i$,
      and the average intensity of said first illuminating light beam, the average intensity of said second illuminating light beam, and said angular frequencies being chosen so as to get close to a maximum of each said amplitude of the intensity component of said fluorescence radiation.

13. The method as claimed in claim 12, wherein each said reversibly photoswitchable fluorescent species has a first and a second chemical states, at least one of said states being fluorescent, each said reversibly photoswitchable fluorescent species being capable of being converted from said first state to said second state via a first photo-induced reaction, then of returning to said first state via a second photo-induced reaction, and wherein said first illuminating light beam has an average intensity $I_1^0$ and is periodically modulated with a said first function, and said second illuminating light beam has an average intensity $I_0^2$ with for each said reversibly photoswitchable fluorescent species:

$$(\sigma_{12,1}+\sigma_{21,1})I_1^0=(\sigma_{12,2}+\sigma_{21,2})I_2^0$$

where $\sigma_{12,1}I_1^0$ and $\sigma_{21,1}I_1^0$ are the rate constants of said first and said second reactions photo-induced by said first light beam illuminating said species, respectively; and where $\sigma_{12,2}I_2^0$ and $\sigma_{21,2}I_2^0$ are the rate constants of said first and said second reactions photo-induced by said second light beam illuminating said species, respectively.

14. The method as claimed in claim 13, wherein the ratio between at least two said angular frequencies co, is strictly higher than 10.

15. The method as claimed in claim 13, wherein, for each said angular frequency $\omega_i$ corresponding to one said reversibly photoswitchable fluorescent species:

$$\omega_i=2(\sigma_{12,1}+\sigma_{21,1})I_1^0$$

where $\sigma_{12,1}I_1^0$ and $\sigma_{21,1}I_1^0$ are the rate constants of said first and said second reactions photo-induced by said first light beam illuminating said species, respectively.

* * * * *

UNITED STATES PATENT AND TRADEMARK OFFICE
CERTIFICATE OF CORRECTION

PATENT NO. : 10,718,712 B2
APPLICATION NO. : 16/330040
DATED : July 21, 2020
INVENTOR(S) : Jérôme Querard et al.

It is certified that error appears in the above-identified patent and that said Letters Patent is hereby corrected as shown below:

In the Claims

In Claim 1, Column 20, Line 34, "angular frequency co being" should be -- angular frequency $\omega$ being --.

In Claim 13, Column 22, Line 32, "an average intensity $I_o^2$ with" should be -- an average intensity $I_2^0$ with --.

In Claim 14, Column 22, Line 42, "angular frequencies co, is strictly" should be -- angular frequencies $\omega_i$ is strictly --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*